United States Patent [19]

Mazany et al.

[11] Patent Number: 6,025,460
[45] Date of Patent: Feb. 15, 2000

[54] POLYAMIDE PRECURSOR

[75] Inventors: Anthony M. Mazany, Akron; Stanley G. Prybyla, Brecksville, both of Ohio

[73] Assignee: Ohio Aerospace Institute, Brook Park, Ohio

[21] Appl. No.: 08/964,256

[22] Filed: Nov. 4, 1997

Related U.S. Application Data

[62] Division of application No. 08/620,693, Mar. 21, 1996, Pat. No. 5,716,677.
[51] Int. Cl.$^7$ ............................. C08G 73/10; C08G 69/26
[52] U.S. Cl. ......................... 528/353; 528/125; 528/126; 528/128; 528/170; 528/172; 528/173; 528/176; 528/185; 528/188; 528/220; 528/229; 528/350
[58] Field of Search ..................................... 528/353, 125, 528/128, 126, 170, 173, 172, 176, 188, 185, 220, 229, 350

[56] References Cited

U.S. PATENT DOCUMENTS

| | | |
|---|---|---|
| 3,356,648 | 12/1967 | Rogers . |
| 3,546,152 | 12/1970 | Bolton . |
| 3,745,149 | 7/1973 | Serafini et al. . |
| 3,849,226 | 11/1974 | Butz . |
| 3,868,351 | 2/1975 | Hand et al. . |
| 3,959,350 | 5/1976 | Rogers . |
| 4,189,518 | 2/1980 | Peterson . |
| 4,244,857 | 1/1981 | Serafini et al. . |
| 4,336,175 | 6/1982 | Gibbs ........................................ 528/353 |
| 4,347,286 | 8/1982 | Ishizuka et al. . |
| 4,378,400 | 3/1983 | Makino et al. .......................... 528/353 |
| 4,533,574 | 8/1985 | Fryd et al. . |
| 4,535,115 | 8/1985 | Bakshi et al. ............................ 528/353 |
| 4,543,295 | 9/1985 | St. Clair et al. . |
| 4,845,150 | 7/1989 | Kovak et al. . |
| 4,864,015 | 9/1989 | Cella et al. . |
| 4,865,903 | 9/1989 | Adiletta . |
| 4,874,835 | 10/1989 | Berdahl . |
| 4,913,759 | 4/1990 | Wright . |
| 4,939,235 | 7/1990 | Harvey et al. . |
| 4,973,442 | 11/1990 | Harvey et al. . |
| 4,978,737 | 12/1990 | Vora . |
| 4,980,447 | 12/1990 | Khanna . |
| 5,013,588 | 5/1991 | Lin . |
| 5,059,273 | 10/1991 | Boyce et al. . |
| 5,061,784 | 10/1991 | Mueller et al. . |
| 5,071,948 | 12/1991 | Khanna . |
| 5,091,505 | 2/1992 | Serafini et al. . |
| 5,124,199 | 6/1992 | O'Quinn et al. . |
| 5,125,993 | 6/1992 | Principe . |
| 5,132,395 | 7/1992 | Serafini et al. . |
| 5,137,751 | 8/1992 | Burgess et al. . |
| 5,149,760 | 9/1992 | Serafini et al. . |
| 5,149,772 | 9/1992 | Serafini et al. . |
| 5,166,292 | 11/1992 | Pottiger et al. ......................... 528/353 |
| 5,166,308 | 11/1992 | Kreuz et al. ............................ 528/353 |
| 5,168,011 | 12/1992 | Kovar et al. . |
| 5,171,828 | 12/1992 | Meterko et al. ........................ 528/353 |
| 5,177,180 | 1/1993 | Griffin et al. ........................... 528/353 |
| 5,230,937 | 7/1993 | Effenberger et al. . |
| 5,286,890 | 2/1994 | Dougherty . |
| 5,296,183 | 3/1994 | Carbone et al. . |
| 5,304,627 | 4/1994 | Connell et al. . |
| 5,338,827 | 8/1994 | Serafini et al. ........................ 528/353 |
| 5,360,671 | 11/1994 | Harris . |
| 5,419,927 | 5/1995 | Dietrich . |
| 5,432,001 | 7/1995 | Serafini et al. . |
| 5,461,137 | 10/1995 | Serafini et al. . |
| 5,461,138 | 10/1995 | Serafini et al. . |
| 5,486,096 | 1/1996 | Hertel et al. . |
| 5,543,493 | 8/1996 | Park et al. . |

*Primary Examiner*—P. Hampton-Hightower
*Attorney, Agent, or Firm*—Vickers, Daniels & Young

[57] ABSTRACT

The service life of fiber-reinforced polyimide composites in a high temperature oxidative environment is extended by coating with a polyimide coating precursor solution that is synthesized by reacting an aromatic dianhydride with an aromatic diamine in a non-reactive solvent. The reactive solution is heated to a temperature sufficent to reduce its viscosity prior to its use as a coating. Preferably, a mixture of meta-phenylenediamine and para-phenylenediamine is reacted with biphenyldianhydride in n-methyl pyrrolidinone solvent and thereafter heated to between about 50° C. (122° F.) and 150° C. (302° F.) under nitrogen while stirring for a time sufficient to obtain a polyamic acid polyimide precursor coating solution having a Brookfield viscosity of from about 500 to about 5000 cP and a solids content of from about 5 to about 35 weight percent.

43 Claims, No Drawings

POLYAMIDE PRECURSOR

This is a division, of application Ser. No. 08/620,693 filed on Mar. 21, 1996, now U.S. Pat. No. 5,716,677.

This invention relates to protective coatings for polyimide composites and methods of synthesis of such coatings.

BACKGROUND OF THE INVENTION

Over the past twenty-five years, advanced polymeric matrix composites have become established as high-performance structural materials, but composite oxidation limits service lifetimes at elevated temperature. Protective coatings that provide improved thermo-mechanical performance at high temperatures are needed to effectively utilize polymeric matrix composites in future aerospace applications. Protection of machined surfaces, especially machined edges having exposed fibers, from rapid oxidation, is especially needed.

One widely used polymeric matrix material is an addition-type polyimide known as PMR-15. Due to PMR-15's relatively high service temperature, processing ease and good thermal stability, it has become the polyimide "standard" for the aerospace industry. However, due to oxidation, a carbon fiber/PMR-15 composite will lose about five to seven percent in compression strength for every one percent in weight loss.

A coating of a fluorinated polyimide known as L30N has been shown to protect carbon fiber/PMR-15 composites from erosion at elevated temperature. The L30N resin is currently commercially available from TRW, Inc. of Redondo Beach, Calif. as PFPI.

Thin ceramic coatings have also been investigated as oxygen barriers to protect PMR-15 substrates at elevated temperatures. In most cases, these coatings did protect the composite surface from oxidative degradation over several hundred hours of constant thermal conditioning up to 380° C. (716° F.). However, such ceramic coatings have an extreme mismatch in the coefficient of thermal expansion (CTE) between the ceramic protective film and the polymeric composite. The internal or compressive stresses that are formed in the ceramic coating during cooling in the CVD reactor are significant enough to cause the protective layer to crack or delaminate from the composite substrate. This CTE problem is very significant when a composite component undergoes thermal cycling during service, commonly resulting in spalling of the coating. In order to reduce the thermal stresses at the composite/coating interface, compliant layers consisting of different fluorinated high-temperature polyimides have been used.

According to the invention, there is provided a polyamic acid polyimide precursor solution suitable for use as a coating to protect polyimide substrates against thermally induced oxidative degradation. Coatings according to the invention may be sprayed or brushed on to the substrate. Following application of the polyamic acid solution, the coated substrate is heated to convert the coating to a polyimide.

The coating solution may be prepared by by reacting an aromatic dianhydride with an aromatic diamine in a non-reactive solvent and heating the solution to a temperature between 50° C. and 150° C., more preferably from 80° C. to 145° C. In certain emodiments, the reactive coating solution is preferably heated until a viscosity drop occurs. The heating may be carried out at at elevated temperature above 50° C. in an inert atmosphere for a time sufficient to obtain a polyamic acid having a Brookfield viscosity of from about 500 to about 5000 cP, more preferably about 600 to about 2000 cP and a solids content of from about 5 to about 35 weight percent, more preferably from about 10 to about 30 weight percent. Suitable material has been obtained by heating the reactive mixture under nitrogen near but not at reflux for about one hour in in n-methyl pyrrolidinone solvent (NMP)

Although meta-phenylenediamine or para-phenylenediamine can be used individually, a mixture of meta-phenylenediamine and para-phenylenediamine preferably is used in combination with 3,3'4,4'-biphenyldianhydride. The meta-phenylenediamine isomer is believed to provide a "kink" in the polymer chain backbone as contrasted with a straight polymer chain backbone which is expected if only para-phenylenediamine is used. This was done in an attempt to create a less brittle and more ductile coating than would result if only para-phenylenediamine was used. The ratio of meta-PDA to para-PDA is preferably from about 90:10 to about 15:85, and more preferably, from about 75:25 to about 50:50.

It is believed that 2,3,3',4,4'-biphenyldianhydride can be used as a total or partial substitute for 3,3'4,4'-biphenyldianhydride.

It is believed that a suitable coating can be made by reacting 3,3',4,4'-biphenyldianhydride (BPDA) with a 0.8 to 1.2:1, preferably 0.9 to 1.1:1 stoichiometric ratio of meta-phenylenediamine and para-phenylenediamine in NMP. Stoichiometric excess of PDA will result in excess amine linkages. Stoichiometric excess of BPDA is believed preferable to provide excess carboxyl groups which are expected to enhance adhesion of the coating to a polyimide substrate.

The inclusion of one or more diamines or dianhydrides other than those disclosed, e.g. aliphatic diamines or aliphatic dianhydrides or other aromatic diamines and dianhydrides, as reactants in the process may detract from one or more desirable properties of the polymeric products. However, the inclusion of such materials, to the extent that they do not detract substantially from the desirable results obtained with the stated reactants, is contemplated in the formation of the corresponding copolymers.

The reaction to form the polyamic acid is preferably carried out in a polar solvent. The most preferred solvent is n-methyl pyrrolidinone solvent (NMP). However, it is believed that other solvents such as alcohols, ketones, ethers, cyclic amides and dialkylsulfoxides may be employed as well as mixtures of solvents.

EXAMPLE 1

A high-molecular-weight polyamic acid solution according to the invention was synthesized by reacting 3,3',4,4'-biphenyidianhydride (BPDA) with a 1.01:1 stoichiometric ratio of meta-phenylenediamine and para-phenylenediamine in NMP. The acronym "PDA" is used herein to represent the phenylenediamine mixture. This candidate BPDA/PDA polyamic acid coating solution was synthesized as follows. 85.63 g of BPDA was dissolved into 276 g of NMP (from Aldrich) in a 600 ml beaker equipped with a mechanical stirrer at a temperature of about 30° C. 7.80 g of meta-phenylenediamine and 5.19 g para-phenylenediamine were dry mixed, then added to the same 600 ml beaker while stirring. An exothermic reaction immediately began, raising the temperature approximately 20° C. The entire contents of the beaker were then transferred to a 1000 ml round bottom glass reactor equipped with an electrical heating mantle, a mechanical stirrer, a condenser, a drying tube, and a nitrogen purge. The reactor and its contents were then heated while stirring. As the reaction proceeded, the brown, transparent solution became quite viscous as indicated by a substantially diminished vortex. As the reaction proceeded further, an increased vortex appeared indicating a reduction in viscosity. After stirring 1 hour under nitrogen while heating towards reflux, the reactor was permitted to cool. The Brookfield viscosity of the resulting solution was about 575 cP.

EXAMPLE 2

The synthesis of Example 1 was repeated except that samples were withdrawn periodically from the round bottom reactor as the reaction proceeded. The Brookfield viscosity at 50° C. reaction temperature was 39,200 cP. As the reaction temperature rose to 100° C., the solution started to thin out and exhibited a Brookfield viscosity of 5500 cP. As the reaction temperature rose to 140° C., the solution became quite thin as evidenced by the vortex pattern and a Brookfield viscosity of 850 cP. After stirring 1 hour under nitrogen while heating towards reflux, the reactor was permitted to cool. The Brookfield viscosity of the resulting solution was about 800 cP.

EXAMPLE 3

The synthesis of Example 1 was repeated except that only para-phenylenediamine was used.

The protective performance of the coating solution of Example 1 was compared with the following high-temperature polyimide solutions: a PFPI resin formulation (PMDA/4-BDAF, Lot #06-0294-01F) and a another PFPI resin formulation (6FDA/4-BDAF, Lot#12-0994-01F) from TRW, Inc. of Redondo Beach, Calif.

The PFPI resins obtained from TRW are believed to be high-molecular-weight, linear polyimides both containing the 2,2-bis[4-(4-aminophenoxy)-phenyl]hexafluoropropane (4-BDAF) monomer structure. These TRW systems are believed to be based upon 2,2-bis(3',4'-dicarboxyphenyl) hexafluoropropane dianhydride (6FDA) and the 4-BDAF monomer which are very expensive today at more than US$800/kg. In contrast, the BPDA/PDA polyamic acid solution according to the invention provides good thermal stability at reasonable cost.

The effectiveness of the coating candidates was evaluated on composite panels that were fabricated from Fiberite (Greenville, Tex.) PMR-15 prepreg reinforced with Celion (Charlotte, N.C.) G30-500 carbon (graphite) fiber. The Celion fiber was sized with EP03 epoxy finish and woven as an eight-harness satin cloth. Standard PMR-15 autoclave cure and oven post-cure cycles were used to fabricate the laminates.

The solids content for all three polyimide solutions was determined by subjecting samples to a 3-h oven exposure at 205° C. (401° F.). The Brookfield viscosity was measured for each solution. A summary of these results can be found in Table 1.

TABLE 1

Description of High-Temperature Polyimide Coatings.

| RESIN TYPE | AVERAGE SOLIDS CONTENT (WT %) | BROOKFIELD VISCOSITY (12 RPM) (cP.) |
| --- | --- | --- |
| BPDA/PDA | 16 | 575 |
| 6FDA/4-BDAF | 25.7 | 12,000 |
| PMDA/4-BDAF (AS-RECEIVED) | 23.4 | 100,000+ |
| PMDA/4-BDAF (DILUTED) | 12.1 | 7,500 |

There is a trade-off between solids content and solution viscosity. For a spray application, it is desirable to keep the solution viscosity under 2,000 cP. For a brush-on coating, a viscosity range between 5,000 and 10,000 cP is preferred. In formulating a coating, the objective is to achieve as high as solids content as possible, but still remain within the viscosity ranges previously described. A high solids content is desirable because more polyimide resin can be placed on the substrate during each coating application. A low viscosity coating solution may facilitate penetration or absorption of the coating into the fiber bundles exposed by machining, thereby providing better sealing of the fiber bundles, and thus better protection of the composite. The low viscosity of the BPDA/PDA coating solution may have facilitated penetration or absorption, e.g. by capillary action, of the coating resin into the fiber bundles exposed by machining, thereby providing better sealing of the fiber bundles.

As shown in Table 1, the Brookfield viscosity of the 16 wt % solids content BPDA/PDA coating solution was measured to be only 575 cP. Ten applications (by brushing) of this BPDA/PDA coating solution were required to obtain the desired coating thickness level on the substrate.

The 6FDA/4-BDAF polyamic acid solution at 25.7 wt % solids was easily applied by brush. Only three applications of this solution were required to reach the desired coating thickness of about 0.075–0.10 mm (or 3–4 mils). The PMDA/4-BDAF solution as received from TRW was so viscous that it would not pour from the container. This polyamic acid solution was diluted down to 12.1 wt % solids with HPLC-grade NMP to obtain a material that could be applied by brush. A total of six applications were needed to form a uniform coating of approximately 4 mils thickness.

Two panels of pre-fabricated carbon fiber/PMR-15 composite laminates were brush-coated with each of the three high-temperature protective coatings. Two additional substrates were left uncoated and used as the controls for the experiment. All of the carbon fiber/PMR-15 panels were solvent wiped, dried at 100° C., grit blasted with 150 silicon carbide grit, water rinsed, then solvent wiped and dried at 100° C., then cooled to room temperature and stored in a dessicator before coating.

After pretreatment, the panels were coated by brushing with the following polyamic acid solutions: BPDA/PDA, PMDA/4-BDAF, or 6FDA/4-BDAF. Each solution was brushed on the substrates by first coating one side of the panel followed by the panel edges. The panels were then placed in an air-recirculating oven for 15 min at each of the following temperatures: 50° C. (122° F.), 75° C. (167° F.), 100° C. (212° F.), 125° C. (257° F.), and finally 150° C. (302° F.). This "pre-bake" allowed the coatings to partially dry by removing most of the NMP solvent and initiated the imidization reaction of the polyamic acid coating solution.

After the panels were allowed to cool to room temperature, they were turned over and brush-coated on the other side as well as on the edges. This procedure was repeated until the desired weight/thickness was achieved. Approximately a 0.008 mm to 0.025 mm (0.0003 in to 0.001 in or 0.3 mil to 1 mil) thick film was deposited on a composite substrate each time the coating was applied. The edges thus received twice the number of brush-on coatings as did the faces of the samples. A description of the samples and approximate coating thickness can be found in Table 2.

An estimate of the coating thickness was calculated by using a theoretical density of 1.44 g/cc for each polyimide after cure. Additionally, the actual coating thickness was physically measured after the isothermal aging experiment. The "measured" and "estimated" thickness values were found to be in good agreement. Once each substrate reached the desired coating thickness, all of the laminates including the control were cured in an air recirculating oven for 1 h at 100° C. (212° F.) followed by 3 h at 205° C. (401° F.). This was done to completely remove the NMP solvent from the coating layer and to ensure conversion of the polyamic acid to the polyimide. The final coating post-cure cycle consisted of the following time and temperature intervals: 4 h at 121° C. (250° F.), 4 h at 216° C. (420° F.), 8 h at 260° C. (500° F.) 8 h at 288° C. (550° F.), and 8 h at 302° C. (575° F.).

TABLE 2

Description of High-Temperature Polyimide Brush-Coated Carbon Fiber/PMR-15 Panels.

| COATING | INITIAL PANEL WEIGHT (g) | PANEL THICKNESS WITH COATING mm/(mils) | COATING WEIGHT (g) | COATING PICK-UP (wt. %) | ESTIMATED COATING THICKNESS mm/(mils) | MEASURED COATING THICKNESS mm/(mils) |
|---|---|---|---|---|---|---|
| 6FDA/4-BDAF | 64.7760 | 4.39/(173) | 2.1828 | 3.3 | 0.08/(3.3) | 0.10/(3.8) |
| 6FDA/4-BDAF | 63.6566 | 4.47/(176) | 2.9262 | 4.6 | 0.11/(4.3) | 0.12/(4.6) |
| BPDA/PDA | 55.7381 | 4.24/(167) | 2.1608 | 3.9 | 0.08/(3.2) | 0.09/(3.6) |
| BPDA/PDA | 61.0691 | 4.09(161) | 2.5137 | 4.1 | 0.09/(3.4) | 0.10/(4.0) |
| PMDA/4-BDAF | 64.1604 | 4.52/(178) | 2.2534 | 3.5 | 0.09/(3.4) | 0.10/(3.8) |
| PMDA/4-BDAF | 63.0053 | 4.45/(175) | 2.4520 | 3.9 | 0.09/(3.7) | 0.11/(4.4) |
| CONTROL | 53.5461 | 3.89/(153) | — | — | — | — |

The coated laminates (and control) were isothermally aged in an open air-recirculating Blue-M oven for 4016 h at 288° C. (550° F.). The exposure temperature was chosen to be approximately 28° C. (50° F.) below the glass-transition temperature of the control panel which was measured at 319° C. (606° F.). Laminates were removed from the oven at different intervals in order to determine weight loss as a function of exposure time.

After isothermal exposure, the laminates were machined into compression (ASTM D695) specimens and tested at room temperature on an Instron Universal Testing Machine.

The physical appearance of each coating after isothermal aging was quite different. The BPD/PDA and 6FDA/4-BDAF candidates were extremely tough with only minor surface cracks in specific areas of the coating. The PMDA/4-BDAF coating was extremely brittle with severe cracking and peeling.

All of the coating candidates exhibited excellent adhesion integrity of the carbon fiber to resin interface at the substrate edges. The machined surfaces of the composites that were coated demonstrated no sign of flaking or peeling during isothermal exposure. The edge coating could not be pulled or picked off with a razor blade and remained intact after machining the compression test specimens. Visual investigation of the coating surfaces revealed that the 6FDA/4-BDAF candidate and the BPDA/PDA candidate exhibited excellent adhesion to the carbon fiber/PMR-15 composite substrate and all of the coating candidates exhibited excellent adhesion integrity to the machined surfaces of the composite. No flaking or peeling of the edge coating was observed during isothermal aging.

The thermal oxidative stability (TOS) results for the high-temperature coated G30-500/PMR-15 laminates can be found in Table 3. The weight loss data for the coated laminates represents an average value from two panels while the control depicts data from only one panel.

TABLE 3

Thermal Oxidative Stability For Coated Celion G30-500/PMR-15 Compression Panels (TOS at 288° C.).

| COATING | INITIAL wt (g) | 335 h wt (g) | 620 h wt (g) | 840 h wt (g) |
|---|---|---|---|---|
| CONTROL | 54.4099 | 54.2975 | 54.2071 | 54.1345 |
| PMDA | 66.4138 | 66.2447 | 66.1222 | 66.0287 |
| PMDA | 65.4573 | 65.3073 | 65.1962 | 65.0919 |
| 6FDA | 66.9588 | 66.7839 | 66.6683 | 66.5802 |

TABLE 3-continued

Thermal Oxidative Stability For Coated Celion G30-500/PMR-15 Compression Panels (TOS at 288° C.).

| | | | | |
|---|---|---|---|---|
| 6FDA | 66.5828 | 66.4170 | 66.3043 | 66.2201 |
| BPDA | 63.2939 | 63.1740 | 63.1106 | 63.0585 |
| BPDA | 57.8989 | 57.8032 | 57.7452 | 57.7014 |

| COATING | 1608 h wt (g) | 2184 h wt (g) | 3258 h wt (g) | 4016 h wt (g) |
|---|---|---|---|---|
| CONTROL | 53.8699 | 53.5988 | 52.8020 | 51.9999 |
| PMDA | 65.7165 | 65.3970 | 64.5400 | — |
| PMDA | 64.7505 | 64.4133 | 63.3965 | 62.4083 |
| 6FDA | 66.2479 | 65.9442 | 65.187 | 64.4021 |
| 6FDA | 65.9104 | 65.6117 | 64.8595 | 64.1763 |
| BPDA | 62.8916 | 62.7288 | 62.1875 | 61.5769 |
| BPDA | 57.5591 | 57.4164 | 57.008 | 56.5596 |

The TOS results at 288° C. (550° F.) revealed that both the BPDA/PDA coating and the 6FDA/4-BDAF coating offered excellent thermal protection to the G30-500/PMR-15 composite substrate. After 4016 h (167 days or 5.5 months) of isothermal exposure at 288° C. (550° F.), the BPDA/PDA coated substrate lost only 2.5% of its original weight, while the 6FDA/4-BDAF candidate lost 3.7 wt % and the PMDA/4-BDAF candidate lost 4.7 wt %. The PMDA/4-BDAF candidate with 4.7% weight loss showed no benefit in thermal stability over the control panel which had 4.4% weight loss.

Without a protective coating, the carbon fiber/PMR-15 control lost 2.5 wt % in 2934 h. The application of the 6FDA/4-BDAF polyimide coating extended the exposure time (to achieve 2.5% weight loss) to 3159 h, which represents about an 8% improvement in thermal stability. The application of the BPDA/PDA polyimide coating extended the exposure time to reach 2.5% weight loss to 4016 h, which represents nearly a 37% increase in service lifetime of the coated PMR-15 composite at elevated temperature.

After the completion of the isothermal aging, all of the exposed and baseline (not exposed) laminates were subjected to room temperature compression (ASTM D695) testing. The compression data for the coated laminates represents an average value from two panels (4 tests per panel).

As shown in Table 4, the baseline carbon fiber/PMR-15 composite (no exposure and no coating) had a mean compression strength of 91.0 ksi. After 4016 h of thermal exposure at 288° C. (550° F.), compression strength of the control was 62.9 ksi, which represented a 32% decrease. Two of the coated panels (6FDA/4-BDAF and BPDA/PDA) exhibited only a 16% reduction in compression strength after aging, while the PMDA/4-BDAF coating was found to offer no improvement in retained compression strength when compared to the control.

TABLE 4

Mean Compression Strength Summary

| COATING | ISOTHERMAL EXPOSURE | MEAN COMPRESSION STRENGTH (KSI) |
|---|---|---|
| NONE | NO | 91.0 |
| NONE | YES | 62.9 |
| BPDA/PDA | YES | 76.9 |
| 6FDA/4-BDAF | YES | 75.0 |
| PMDA/4-BDAF | YES | 61.0 |

When designing composite structures for non-load bearing aerospace applications, engineers try to maintain a residual or minimum compression strength of 50 ksi throughout the life of the component. "Useful service lifetime" is therefore defined as the thermo-oxidative exposure time to reach 50 ksi compression strength. A linear relationship appears to exist between mean compression strength and weight loss after 4016 h, 288° C. (550° F.) TOS exposure. A 1% substrate weight loss appears to correspond to approximately a 7 ksi reduction in composite compression strength for the carbon fiber/PMR-15 composites tested. Therefore, a 50 ksi mean compression strength value corresponds to approximately 6.3% in overall composite weight loss. By considering this information and the weight loss prediction results, the service life of non-load bearing carbon fiber/PMR-15 composite structures under 288° C. (550° F.) isothermal exposures can be qualitatively predicted.

For unprotected laminates, the service lifetime at 288° C. (550° F.) would be approximately 4925 h. The 6FDA/4-BDAF coating increased the useful service lifetime to 5700 hours (a 16% gain), whereas the BPDA/PDA coating approached 6875 h which represented a 40% increase. Both coatings offered enhanced thermal protection for carbon fiber/PMR-15 composite substrates by extending the service lifetimes at elevated temperature.

As is known to those skilled in the art, increased adhesion is possible to a substrate that has a chemically active surface. This can best be accomplished by plasma treatment of the substrates after grit-blasting but prior to coating. Plasma variables such as gas type, power level, and reactor residence time would be empirically determined for each system. An increase in adhesion should positively impact the coating performance at elevated temperature.

It is believed that the high temperature service life of any of composites prepared from any of the following high-temperature polyimide matrix resins can be improved by application of a protective coating to the machined edges of fiber reinforced composites. Viable candidates for service at temperatures approaching 371° C. (700° F.) include AFR700B, PMRII-50 and VCAP-75 available from Culver City Composites, Culver City, Calif., MVK-19 available from Maverick Corporation, Cincinnati, Ohio, and Super-lmide™ 800 available from The B.F.Goodrich Company, Brecksville, Ohio.

What is claimed is:

1. A polyimide precursor solution consisting essentially of the reaction product derived from reacting biphenyldianhydride with an aromatic diamine in a stoichiometric ratio of up to about 1.2:1 in a non-reactive solvent to form excess carboxyl groups and heating the solution to a temperature above about 50° C. until a viscosity drop occurs, said aromatic diamine including a diamine selected from the group consisting of meta-phenylenediamine, para-phenylenediamine, and mixtures thereof.

2. A polyimide precursor solution according to claim 1, wherein the non-reactive solvent is n-methyl pyrrolidinone.

3. A polyimide precursor solution according to claim 1, wherein the aromatic diamine is selected from the group consisting of meta-phenylenediamine, para-phenylenediamine, and mixtures of meta-phenylenediamine and para-phenylenediamine.

4. A polyimide precursor solution according to claim 1, wherein a 0.8 to 1.2:1 stoichiometric ratio of meta-phenylenediamine and para-phenylenediamine is reacted with biphenyldianhydride for synthesis of the coating solution.

5. A polyimide precursor solution according to claim 1, wherein a 1.01:1 stoichiometric ratio of phenylenediamine to biphenyldianhydride is used for synthesis of the coating solution.

6. A polyimide precursor solution according to claim 1, prepared by dissolving and reacting a mixture of meta-phenylenediamine and para-phenylenediamine and biphenyidianhydride in n-methyl pyrrolidinone solvent, and thereafter heating the reactive solution to between about 50° C. (122° F.) and about 150° C. (302° F.) under nitrogen for a time sufficient to obtain a Brookfield viscosity of from about 500 to about 5000 cP and a solids content of from about 5 to about 35 weight percent.

7. The polyimide precursor solution of claim 6, in which the reactive solution is maintained at an elevated temperature above 50° C. for a time sufficient to produce a solution having viscosity of about 600 to about 2000 cP and a solids content of about 10 to about 30 percent.

8. The polyimide precursor solution claim 6, wherein the ratio of meta-phenylenediamine to para-phenylenediamine is from about 90:10 to about 15:85.

9. The polyimide precursor solution claim 6, wherein the ratio of meta-phenylenediamine to para-phenylenediamine is from about 75:25 to about 50:50.

10. A polyimide precursor for protecting a polyimide matrix article against oxidation comprising an aromatic dianhydride which is reacted with an aromatic diamines, said aromatic diamines including a mixture of para-phenylenediamine and meta-phenylenediamine in a ratio of meta-phenylenediamine to para-phenylenediamine of about 90:10 to about 15:85, said aromatic dianhydride added in a stoichiometric excess to said aromatic diamines to form excess carboxyl groups upon reaction with one another.

11. A polyimide precursor as defined in claim 10, wherein said ratio of said meta-phenylenediamine to said para-phenylenediamine is about 75:25 to about 50:50.

12. A polyimide precursor defined in claim 10, wherein said aromatic dianhydride reacted with said aromatic diamines in a stoichiometric ratio of up to about 1.2:1.

13. A polyimide precursor defined in claim 11, wherein said aromatic dianhydride reacted with said aromatic diamines in a stoichiometric ratio of up to about 1.2:1.

14. A polyimide precursor as defined in claim 10, wherein said aromatic dianhydride includes biphenyldianhydride.

15. A polyimide precursor as defined in claim 13, wherein said aromatic dianhydride includes biphenyldianhydride.

16. A polyimide precursor as defined in claim 10, wherein said aromatic dianhydride reacted with an said aromatic diamines in a non-reactive solvent.

17. A polyimide precursor as defined in claim 15, wherein said aromatic dianhydride reacted with an said aromatic diamines in a non-reactive solvent.

18. A polyimide precursor as defined in claim 16, wherein said non-reactive solvent includes methyl pyrrolidone.

19. A polyimide precursor as defined in claim 17, wherein said non-reactive solvent includes methyl pyrrolidone.

20. A polyimide precursor as defined in claim 10, wherein said aromatic dianhydride and said aromatic diamines are heated to a temperature of about 50° C. to about 150° C. to cause a viscosity drop of said polyamic precursor.

21. A polyimide precursor as defined in claim 19, wherein said aromatic dianhydride and said aromatic diamines are heated to a temperature of about 50° C. to about 150° C. to cause a viscosity drop of said polyamic precursor.

22. A polyimide precursor as defined in claim 20, wherein said aromatic dianhydride and said aromatic diamine are heated until said viscosity drops to a Brookfield viscosity of about 500 cP to about 5000 cP and a solids content of about 5 to about 35 weight percent.

23. A polyimide precursor as defined in claim 21, wherein said aromatic dianhydride and said aromatic diamine are heated until said viscosity drops to a Brookfield viscosity of about 500 cP to about 5000 cP and a solids content of about 5 to about 35 weight percent.

24. A polyimide precursor as defined in claim 22, wherein said aromatic dianhydride and said aromatic diamines are heated for a sufficient time to obtain a Brookfield viscosity of about 600 cP to about 2000 cP and a solids content of about 10 to about 30 weight percent.

25. A polyimide precursor as defined in claim 23, wherein said dianhydride and said aromatic diamines are heated for a sufficient time to obtain a Brookfield viscosity of about 600 cP to about 2000 cP and a solids content of about 10 to about 30 weight percent.

26. A polyimide precursor to protect a polyimide matrix article against oxidation comprising an aromatic dianhydride and an aromatic diamines which are mixed together and heated in a non-reactive solvent to a temperature of about 50° C. to about 150° C. for a sufficient time to cause the viscosity of said mixture to increase and then to decrease until a said polyamic precursor is formed having a Brookfield viscosity of about 500 cP to about 5000 cP and a solids content of about 5 to about 35 weight percent, said aromatic dianhydride including biphenyldianhydride, said aromatic diamines including a mixture of para-phenylenediamine and meta-phenylenediamine, said biphenyldianhydride having a stoichiometric ratio to said aromatic diamine of about 0.8:1 to about 1.2:1, said meta-phenylenediamine and said para-phenylenediamine added in a ratio of about 90:10 to about 15:85.

27. A polyimide precursor as defined in claim 26, wherein said ratio of said meta-phenylenediamine to said para-phenylenediamine is about 75:25 to about 50:50.

28. A polyimide precursor as defined in claim 26, wherein said aromatic dianhydride and said aromatic diamines are heated for a sufficient time to obtain a polyamic precursor having a Brookfield viscosity of about 600 cP to about 2000 cP and a solids content of about 10 to about 30 weight percent.

29. A polyimide precursor as defined in claim 27, wherein said aromatic dianhydride and said aromatic diamines are heated for a sufficient time to obtain a polyamic precursor having a Brookfield viscosity of about 600 cP to about 2000 cP and a solids content of about 10 to about 30 weight percent.

30. A polyimide precursor as defined in claim 26, wherein said aromatic dianhydride and said aromatic diamines are reacted under a nitrogen atmosphere while heating said aromatic dianhydride and said aromatic diamines to a temperature less than a reflux temperature.

31. A polyimide precursor as defined in claim 29, wherein said aromatic dianhydride and said aromatic diamines are reacted under a nitrogen atmosphere while heating said aromatic dianhydride and said aromatic diamines to a temperature less than a reflux temperature.

32. A polyimide precursor as defined in claim 10, wherein said aromatic dianhydride is biphenyldianhydride.

33. A polyimide precursor as defined in claim 25, wherein said aromatic dianhydride is biphenyldianhydride.

34. A polyimide precursor as defined in claim 26, wherein said precursor having a coating thickness of about 0.3 mil to about 4 mils.

35. A polyimide precursor as defined in claim 26, wherein said precursor being applied as a plurality of coating layers on said polyimide matrix article.

36. A polyimide precursor as defined in claim 20, wherein said aromatic dianhydride and said aromatic diamine are heated toward reflux in an atmosphere including nitrogen for at least about one hour.

37. A polyimide precursor as defined in claim 25, wherein said aromatic dianhydride and said aromatic diamine are heated toward reflux in an atmosphere including nitrogen for at least about one hour.

38. A polyimide precursor as defined in claim 10, wherein said precursor is coated onto a polyimide matrix article.

39. A polyimide precursor as defined in claim 37, wherein said precursor is coated onto a polyimide matrix article.

40. A polyimide precursor as defined in claim 38, wherein said precursor having a coating thickness of about 0.3 mil to about 4 mils.

41. A polyimide precursor as defined in claim 39, wherein said precursor having a coating thickness of about 0.3 mil to about 4 mils.

42. A polyimide precursor as defined in claim 38, wherein said precursor being applied as a plurality of coating layers on said polyimide matrix article.

43. A polyimide precursor as defined in claim 41, wherein said precursor being applied as a plurality of coating layers on said polyimide matrix article.

* * * * *

UNITED STATES PATENT AND TRADEMARK OFFICE
CERTIFICATE OF CORRECTION

PATENT NO. : 6,025,460
DATED : 02-15-2000
INVENTOR(S) : Anthony M. Mazany, Stanley G. Prybyla, Joel R. Fried and Robert A. Gray It is certified that error appears in the above-identified patent and that said Letters Patent is hereby corrected as shown below:

On the title page, and Column 1:

Item [54], change "POLYAMIDE PRECURSOR" to --POLYIMIDE PRECURSOR--.

Signed and Sealed this

Third Day of April, 2001

Attest:

NICHOLAS P. GODICI

*Attesting Officer*  *Acting Director of the United States Patent and Trademark Office*